(12) United States Patent
Beck

(10) Patent No.: US 11,297,148 B2
(45) Date of Patent: *Apr. 5, 2022

(54) PROTOCOL FOR ANYCAST BASED DISCOVERY OF LOCAL RESOURCES

(71) Applicant: Charter Communications Operating, LLC, St. Louis, MO (US)

(72) Inventor: Jody Lee Beck, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,775

(22) Filed: Jan. 29, 2021

(65) Prior Publication Data

US 2021/0160332 A1    May 27, 2021

Related U.S. Application Data

(63) Continuation of application No. 16/576,075, filed on Sep. 19, 2019, now Pat. No. 10,951,718, which is a
(Continued)

(51) Int. Cl.
*H04L 29/08* (2006.01)
*H04L 67/51* (2022.01)
(Continued)

(52) U.S. Cl.
CPC ........ *H04L 67/16* (2013.01); *H04L 29/08648* (2013.01); *H04L 67/1002* (2013.01); *H04L 61/1511* (2013.01)

(58) Field of Classification Search
CPC ......... H04L 29/08648; H04L 29/08657; H04L 61/1511; H04L 61/1541; H04L 67/1002;
(Continued)

(56) References Cited

U.S. PATENT DOCUMENTS

| | | | | |
|---|---|---|---|---|
| 6,112,247 A | * | 8/2000 | Williams | ................ H04L 29/06 370/248 |
| 6,236,652 B1 | * | 5/2001 | Preston | ................... H04L 29/06 370/349 |

(Continued)

OTHER PUBLICATIONS

Cheng et al., "Service Discovery Based on Anycasting in Mobile Ad-hoc Networks," ACM 978-1-60558-206-1/08/07. (Year: 2008).*

*Primary Examiner* — Alina A Boutah
(74) *Attorney, Agent, or Firm* — The Marbury Law Group, PLLC

(57) ABSTRACT

Systems, methods, and devices of the various embodiments disclosed herein may provide a protocol enabling anycast based discovery of local resources. Various embodiments may provide a lightweight decentralized directory system that pairs local demands with local resources in a network. Various embodiments may provide a routing (or bridging) protocol that brokers communication between endpoints in Internet Service Provider (ISP) networks. Various embodiments may broker any type services, such as virtual network services, physical services, etc. Various embodiments may pair local demands with local resources in a network without requiring any central network infrastructure and/or requiring a Domain Name System (DNS) server. Various embodiments may support low latency and high bandwidth applications through the pairing of local demands with local resources in a network.

48 Claims, 9 Drawing Sheets

Related U.S. Application Data continuation of application No. 15/903,834, filed on Feb. 23, 2018, now Pat. No. 10,462,233.

(60) Provisional application No. 62/620,695, filed on Jan. 23, 2018.

(51) Int. Cl.
*H04L 67/1001* (2022.01)
*H04L 61/4511* (2022.01)

(58) Field of Classification Search
CPC . H04L 67/16; H04L 67/1014; H04L 67/1021; H04L 67/1023; H04L 67/18; H04L 67/24
See application file for complete search history.

(56) References Cited

U.S. PATENT DOCUMENTS

| | | | | |
|---|---|---|---|---|
| 6,415,323 | B1* | 7/2002 | McCanne | H04L 45/22 709/225 |
| 6,785,704 | B1* | 8/2004 | McCanne | H04L 29/12047 718/105 |
| 6,920,129 | B2* | 7/2005 | Preston | H04L 61/2007 370/349 |
| 7,908,337 | B2* | 3/2011 | Garcia-Luna-Aceves | H04L 12/18 709/217 |
| 9,280,559 | B1* | 3/2016 | Jones | B64C 39/024 |
| 9,300,581 | B1* | 3/2016 | Hui | H04L 61/2015 |
| 9,350,706 | B1* | 5/2016 | Smith | H04L 63/10 |
| 9,363,102 | B1* | 6/2016 | Brandwine | H04L 12/4633 |
| 9,385,925 | B1* | 7/2016 | Scholl | H04L 12/18 |
| 10,462,233 | B2* | 10/2019 | Beck | H04L 67/16 |
| 10,951,718 | B2* | 3/2021 | Beck | H04L 67/16 |
| 2002/0016860 | A1* | 2/2002 | Garcia-Luna-Aceves | H04L 29/12009 709/245 |
| 2003/0182410 | A1* | 9/2003 | Balan | H04L 67/101 709/223 |
| 2007/0133539 | A1* | 6/2007 | Kang | H04L 69/167 370/392 |
| 2007/0276905 | A1* | 11/2007 | Durand | H04L 41/0806 709/203 |
| 2008/0086574 | A1* | 4/2008 | Raciborski | H04L 61/1511 709/245 |
| 2008/0123640 | A1* | 5/2008 | Bhatia | H04L 67/16 370/389 |
| 2009/0113057 | A1* | 4/2009 | Van der Merwe | H04L 29/12349 709/227 |
| 2012/0054347 | A1* | 3/2012 | Lee | H04L 43/08 709/226 |
| 2012/0198037 | A1* | 8/2012 | Shelby | H04W 4/70 709/223 |
| 2013/0318245 | A1* | 11/2013 | Omar | H04L 12/189 709/227 |
| 2014/0002247 | A1* | 1/2014 | Harrison | H04L 65/1069 340/12.5 |
| 2014/0106770 | A1* | 4/2014 | Valentin | H04W 72/1205 455/452.1 |
| 2014/0269268 | A1* | 9/2014 | Rao | H04L 47/125 370/229 |
| 2015/0040173 | A1* | 2/2015 | Panagos | H04L 45/74 725/116 |
| 2015/0113050 | A1* | 4/2015 | Stahl | H04L 67/10 709/203 |
| 2015/0215388 | A1* | 7/2015 | Kontothanassis | H04L 67/1008 709/226 |
| 2015/0334179 | A1* | 11/2015 | Eisenbud | H04L 67/1029 709/226 |
| 2015/0372869 | A1* | 12/2015 | Rao | H04L 12/4633 709/224 |
| 2016/0182358 | A1* | 6/2016 | Peter | H04L 45/74 370/315 |
| 2016/0277463 | A1* | 9/2016 | Nagarajan | H04L 45/16 |
| 2016/0315857 | A1* | 10/2016 | Lubashev | H04L 12/4633 |
| 2016/0352838 | A1* | 12/2016 | Larkin | H04L 45/22 |
| 2016/0360360 | A1* | 12/2016 | Jones | G06F 21/604 |
| 2017/0012857 | A1* | 1/2017 | Li | H04L 67/1044 |
| 2017/0270292 | A1* | 9/2017 | Harrison | G06Q 30/0269 |
| 2017/0303082 | A1* | 10/2017 | Jones | H04L 9/088 |
| 2018/0048525 | A1* | 2/2018 | Karasaridis | H04L 45/70 |
| 2018/0063705 | A1* | 3/2018 | Maslak | H04W 72/0433 |
| 2018/0091873 | A1* | 3/2018 | Navin | G06F 21/53 |
| 2018/0159921 | A1* | 6/2018 | Brinig | H04L 67/24 |

\* cited by examiner

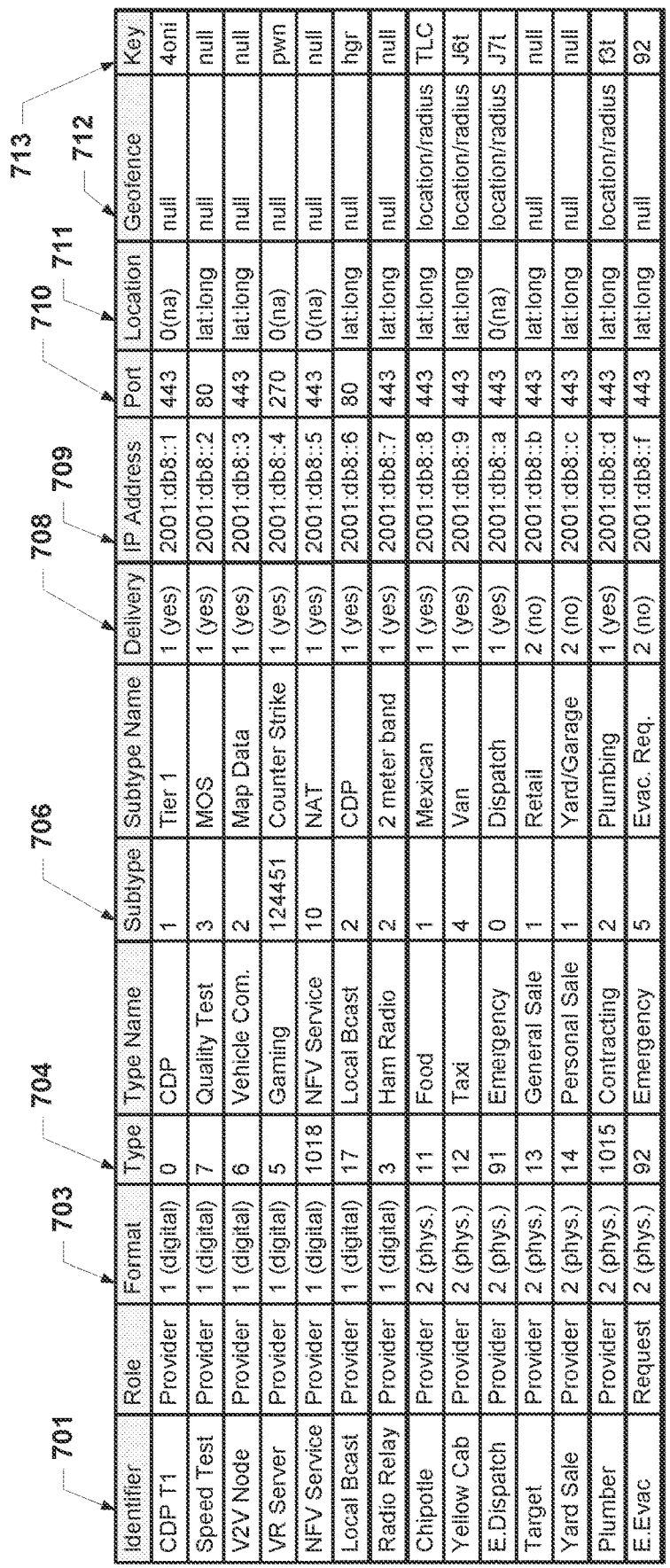

FIG. 7

| Identifier | Role | Format | Type | Type Name | Subtype | Subtype Name | Delivery | IP Address | Port | Location | Geofence | Key |
|---|---|---|---|---|---|---|---|---|---|---|---|---|
| CDP T1 | Provider | 1 (digital) | 0 | CDP | 1 | Tier 1 | 1 (yes) | 2001:db8::1 | 443 | 0(na) | null | 4oni |
| Speed Test | Provider | 1 (digital) | 7 | Quality Test | 3 | MOS | 1 (yes) | 2001:db8::2 | 80 | lat:long | null | null |
| V2V Node | Provider | 1 (digital) | 6 | Vehicle Com. | 2 | Map Data | 1 (yes) | 2001:db8::3 | 443 | lat:long | null | null |
| VR Server | Provider | 1 (digital) | 5 | Gaming | 124451 | Counter Strike | 1 (yes) | 2001:db8::4 | 270 | 0(na) | null | pwn |
| NFV Service | Provider | 1 (digital) | 1018 | NFV Service | 10 | NAT | 1 (yes) | 2001:db8::5 | 443 | 0(na) | null | null |
| Local Bcast | Provider | 1 (digital) | 17 | Local Bcast | 2 | CDP | 1 (yes) | 2001:db8::6 | 80 | lat:long | null | hgr |
| Radio Relay | Provider | 1 (digital) | 3 | Ham Radio | 2 | 2 meter band | 1 (yes) | 2001:db8::7 | 443 | lat:long | null | null |
| Chipotle | Provider | 2 (phys.) | 11 | Food | 1 | Mexican | 1 (yes) | 2001:db8::8 | 443 | lat:long | location/radius | TLC |
| Yellow Cab | Provider | 2 (phys.) | 12 | Taxi | 4 | Van | 1 (yes) | 2001:db8::9 | 443 | lat:long | location/radius | J6t |
| E.Dispatch | Provider | 2 (phys.) | 91 | Emergency | 0 | Dispatch | 1 (yes) | 2001:db8::a | 443 | 0(na) | null | J7t |
| Target | Provider | 2 (phys.) | 13 | General Sale | 1 | Retail | 2 (no) | 2001:db8::b | 443 | lat:long | null | null |
| Yard Sale | Provider | 2 (phys.) | 14 | Personal Sale | 1 | Yard/Garage | 2 (no) | 2001:db8::c | 443 | lat:long | location/radius | null |
| Plumber | Provider | 2 (phys.) | 1015 | Contracting | 2 | Plumbing | 1 (yes) | 2001:db8::d | 443 | lat:long | null | f3t |
| E.Evac | Request | 2 (phys.) | 92 | Emergency | 5 | Evac. Req. | 2 (no) | 2001:db8::f | 443 | lat:long | null | 92 |

PROTOCOL FOR ANYCAST BASED DISCOVERY OF LOCAL RESOURCES

RELATED APPLICATIONS

This application is a continuation of, and claims the benefit of priority to, U.S. Non-Provisional patent application Ser. No. 16/576,075 entitled "Protocol For Anycast Based Discovery Of Local Resources" filed Sep. 19, 2019, which is a continuation of, and claims the benefit of priority to, U.S. Non-Provisional patent application Ser. No. 15/903,834 entitled "Protocol For Anycast Based Discovery Of Local Resources" filed Feb. 23, 2018, which claims the benefit of priority to U.S. Provisional Patent Application 62/620,695 entitled "Protocol For Anycast based Discovery Of Local Resources," filed Jan. 23, 2018, the entire contents of all of which are hereby incorporated by reference for all purposes.

BACKGROUND

Current conventional network models represent a top-down centralized approach to computing. Typically, in current conventional network models an origin server hosts resources and/or content items for use by users' respective computing devices. In current conventional network models, users access the origin server via connections between the user's respective computing devices and the origin server established using an internet service provider (ISP) network. In current conventional content delivery models, supporting the access to the origin server places high demands on the ISP networks, the multiple connections and ISP network resources between the users' respective computing devices and the origin server which can increase latency and/or decrease available bandwidth associated with the access.

SUMMARY

The systems, methods, and devices of the various embodiments disclosed herein may provide a protocol enabling anycast based discovery of local resources. Various embodiments may provide a lightweight decentralized directory system that pairs local demands with local resources in a network. Various embodiments may provide a routing (or bridging) protocol that brokers communication between endpoints in Internet Service Provider (ISP) networks. Various embodiments may broker any type services, such as virtual network services, physical services, etc. Various embodiments may pair local demands with local resources in a network without requiring any central network infrastructure and/or requiring a Domain Name System (DNS) server. Various embodiments may support low latency and high bandwidth applications through the pairing of local demands with local resources in a network.

Various embodiments may provide methods for anycast resource discovery including receiving one or more anycast resource publication messages from one or more resource computing devices, each anycast resource publication message including an identifier, a type indication, a subtype indication, a delivery indication, an Internet Protocol (IP) address indication, and a port indication associated with the respective resource computing device sending that resource publication message, storing a unique entry in a database of services for each received anycast resource publication message, each unique entry including the identifier, the type indication, the subtype indication, the delivery indication, the address indication, and the port indication of that respective received anycast resource publication message, receiving an anycast service request message from a client computing device, the anycast service request message indicating at least a type request, determining any type indications stored in the database of services matching the type request and sending a service response message to the client computing device, the service response message including the unique entries having type indications determined to match the type request.

Various embodiments may provide methods for anycast resource provisioning including sending an anycast resource publication message to an ARDP node server, the anycast resource publication message including an identifier, a type indication, a subtype indication, a delivery indication, an Internet Protocol (IP) address indication, and a port indication of the computing device.

Various embodiments may provide method for anycast resource discovery, including sending an anycast service request message to an ARDP node server, the anycast service request message indicating at least a type request, receiving a service response message from the ARDP server, the service response message including an identifier, a type indication, a subtype indication, a delivery indication, an IP address indication, and a port indication of at least one resource computing device and the type indication matching the type request.

Further embodiments disclosed herein include a computing device having a processor configured with processor-executable instructions to perform operations of the methods summarized above. Further embodiments disclosed herein include a computing device including means for performing functions of the methods summarized above. Further embodiments disclosed herein include a non-transitory processor-readable storage medium having stored thereon processor-executable instructions configured to cause a computing device processor to perform operations of the methods summarized above. Further embodiments disclosed herein include a server configured with processor executable instructions to perform operations of the methods summarized above. Further embodiments disclosed herein include a server including means for performing functions of the methods summarized above. Further embodiments disclosed herein include a non-transitory processor-readable storage medium having stored thereon processor-executable instructions configured to cause a server processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

FIG. 7 illustrates example unique entries in a database of services according to various embodiments.

DETAILED DESCRIPTION

Figure 1:
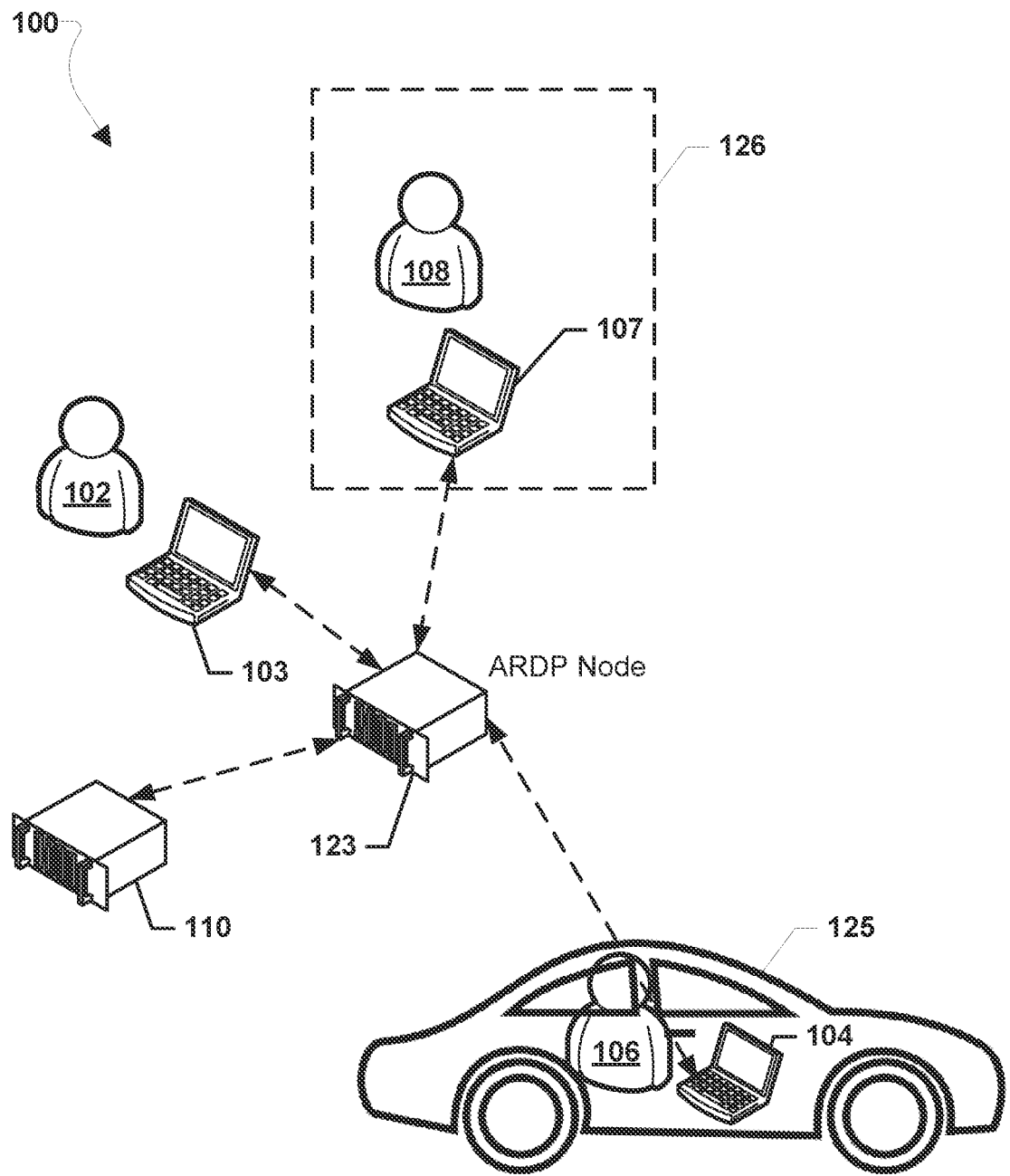
FIG. 1 is a system block diagram of computing devices in communication with an anycast resource discovery protocol (ARDP) node according to various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "computing device" and "node" are used interchangeably herein to refer to any one or all of satellite or cable set top boxes, laptop computers, rack mounted computers, routers, cellular telephones, smart phones, personal or mobile multi-media players, personal data assistants (PDAs), personal computers, tablet computers, smart books, palm-top computers, desk-top computers, wireless electronic mail receivers, multimedia Internet enabled cellular telephones, wireless gaming controllers, gaming consoles, streaming media players (such as, ROKU™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

The systems, methods, and devices of the various embodiments may provide a protocol enabling anycast based discovery and provisioning of local resources. Various embodiments may provide a lightweight decentralized directory system that pairs local demands with local resources in a network. Various embodiments may provide a routing (or bridging) protocol that brokers communication between endpoints in Internet Service Provider (ISP) networks.

Various embodiments may include a resource computing device, such as a computing device associated with providing a physical and/or virtual service, configured to generate and send anycast resource publication messages to anycast resource discovery protocol (ARDP) node servers. In various embodiments, anycast resource publication messages may include information associated with the resource computing device and/or the service associated with the resource computing device. For example, anycast resource publication messages may include an identifier of the service and/or computing device, a type indication for the service, a subtype indication for the service, a delivery indication for the service, an Internet Protocol (IP) address indication for the resource computing device, a port indication for the resource computing device, and/or a format indication for the service. Anycast resource publication messages may further include a location of the resource computing device, such as a latitude and longitude determined using the Global Positioning System (GPS) or other systems, and/or a geofence associated with the service and/or resource computing device. The geofence may be an indication of a location, such as a latitude and a longitude, and a radius extending from the location. Other type geofences, such as geographic indications (e.g., states, counties, towns, zip codes, etc.), street indications (e.g., intersection names, etc.), or any other type geofence indication may be substituted in various embodiments for location and radius indications. Anycast resource publication messages may further include keys for a service and/or resource computing device. A key may be a unique code associated with a service and/or resource computing device. A key may uniquely identify the ARDP node server to which the anycast resource publication message was sent.

Various embodiments may include an ARDP node server, such as a server in an ISP network, configured to receive and respond to anycast messages and store a database of services. In various embodiments, an ARDP node server may receive anycast resource publication messages from resource computing devices and store a unique entry in the database of services for each received resource publication message. In various embodiments, the ARDP node server may be configured to search the database of services based on one or more elements in the unique entries and determine matches between the one or more elements in the unique entries and various criteria.

Various embodiments may include a client computing device, such as a computing device associated with receiving a physical and/or virtual service, configured to generate and send anycast service request messages to an ARDP node server. In various embodiments, anycast service request messages may indicate a type request for a service. A type request may be a code or other indication corresponding to a type indication of a service the client computing device is attempting to discovery availability for. In various embodiments, an anycast service request message may further include one or more other criteria for a service, such as a subtype request, a delivery request, a format request, etc.

In various embodiments, an ARDP node server may receive an anycast service request message and determine whether any type indications or other elements for a service stored in the database of services match the type request or other criteria for a service included in the anycast server request message. In response to determining matches, the ARDP node server may send a service response message to the client computing device including the determined matching unique entries. In this manner, the service response message may include information associated with resource computing devices and/or services associated with resource computing devices. For example, service response messages may include an identifier of the service and/or computing device, a type indication for the service, a subtype indication for the service, a delivery indication for the service, an Internet Protocol (IP) address indication for the resource computing device, a port indication for the resource computing device, a format indication for the service, a location of the resource computing device, a geofence associated with the service and/or resource computing device, and/or keys for a service and/or resource computing device.

In various embodiments, the client computing device may use the information in the service response message to send a communication to one or more resource computing device. The communication may be sent directly from the client computing device to the resource computing device without any proxy support or further connection brokering from the ARDP node server. For example, the client computing device may send a communication to a port of the resource computing device corresponding to the port indication in the service response message. As a specific example, the client computing device may select a resource computing devices from the service response message to provide a service, and may send a message routed directly to that resource computing device using the IP address and port indications in the service response message. The message may be a join request or other type message configured to enable the client computing device to receive the service from the resource computing device. In some embodiments, the client computing device may select the resource computing device based on whether the client computing device's current location is within an area defined by a location indication and geofence indication in the service response message. When the client computing device is outside the area, the client computing device may not send the communication to the resource computing device as the client computing device may be outside the service area. In some embodiments, the client computing device may include the key for a service and/or resource computing device indicated in the service response message in the communication to the resource computing device.

In various embodiments, in response to receiving a communication from a client computing device, a resource computing device may send a response message to the client computing device. The response message may be sent directly from the resource computing device to the client computing device without any proxy support or further connection brokering from the ARDP server. In this manner, the client computing device and the resource computing device may establish a connection brokered by those two computing devices directly without further involvement by the ARDP node to provision and receive the service.

Various embodiments may broker any type services, such as virtual network services, physical services, etc. Various embodiments may pair local demands with local resources in a network without requiring any central network infrastructure and/or requiring a Domain Name System (DNS) server. Various embodiments may support low latency and high bandwidth applications through the pairing of local demands with local resources in a network.

An example physical service that various embodiments may enable is a local taxi service. A computing device of a taxi, such as the driver's smart phone, may send an anycast resource publication message to an ARDP node indicating that the taxi is available to provide transportation within a designated area. The ARDP node may store the taxi's information as a unique entry in a database of services. A user desiring a taxi ride may send an anycast service request message to the ARDP node from his or her computing device, such as his or her smart phone, indicating a type request associated with taxi services. The ARDP node may send a service response message including the unique entry in the database of services for the local taxi service. The user's computing device may use the information in the service response message to communicate with the computing device of the taxi directly without proxy through the ARDP node or another central service server. The user's computing device and the computing device of the taxi may determine to establish a connection brokered by those two computing devices directly without further involvement by the ARDP node to provision and receive the taxi service. For example, the user's computing device may route the user's location and payment information directly to the computing device of the taxi and the computing device of the taxi may route a confirmation of ride acceptance directly to the user's computing device.

An example virtual service that various embodiments may enable is local gaming services. A game server may send an anycast resource publication message to an ARDP node indicating that the game server is hosting a game. The ARDP node may store the game server's information as a unique entry in a database of services. A user desiring to play the game may send an anycast service request message to the ARDP node from his or her computing device, such as a game console, indicating a type request associated with gaming services. The ARDP node may send a service response message including the unique entry in the database of services for the local game server. The user's computing device may use the information in the service response message to communicate with the game server directly without proxy through the ARDP node or another central service server. For example, the user's computing device may send a join request to the game server. The user's computing device and the game server may determine to establish a connection brokered by those two computing devices directly without further involvement by the ARDP node to provision and receive gaming service.

Another example physical service that various embodiments may enable is a food delivery service. A computing device of a restaurant may send an anycast resource publication message to an ARDP node indicating that the restaurant provides delivery service within a local designated area. The ARDP node may store the restaurant's information as a unique entry in a database of services. A user desiring a food delivery service may send an anycast service request message to the ARDP node from his or her computing device, such as his or her smart phone, indicating a type request associated with food delivery. The ARDP node may send a service response message including the unique entry in the database of services for the local restaurant. The user's computing device may use the information in the service response message to communicate with the computing device of the restaurant directly without proxy through the ARDP node or another central service server. The user's computing device and the computing device of the restaurant may determine to establish a connection brokered by those two computing devices directly without further involvement by the ARDP node to provision and receive the food delivery service. For example, the user's computing device may request a menu from the computing device of the restaurant and the computing device of the restaurant may send the menu directly to the user's computing device. The user's computing device may route the user's food selections, location, and payment information directly to the computing device of the restaurant and the computing device of the restaurant may route a confirmation of the order and delivery estimated time directly to the user's computing device.

An example virtual service that various embodiments may enable is local sports (or other type media) broadcast service. A videographer desiring to broadcast a football game he or she is filming may send an anycast resource publication message to an ARDP node indicating the server information for the server hosting the video being live streamed from the football game. The ARDP node may store the server's information as a unique entry in a database of services. A user desiring to stream the football game may send an anycast service request message to the ARDP node from his or her computing device indicating a type request associated with local broadcast services. The ARDP node may send a service response message including the unique entry in the database of services for the server hosting the video of the football game. The user's computing device may use the information in the service response message to communicate with the server hosting the video of the football game directly without proxy through the ARDP node or another central service server. For example, the user's computing device may send a request to the server hosting the video of the football game to receive the live stream of the football game. The user's computing device and the server hosting the video of the football game may determine to establish a connection brokered by those two computing devices directly without further involvement by the ARDP node to provision and receive live stream of the football game.

Another example physical service that various embodiments may enable is an emergency response service. A computing device of a user in need of emergency assistance may send an anycast resource publication message to an ARDP node indicating that the user's location and the emergency (e.g., needing rescue, needing an ambulance, etc.). The ARDP node may store the user in need of emergency assistance's information as a unique entry in a database of services. An emergency responder may send an anycast service request message to the ARDP node from his or her computing device indicating a type request associated with emergency response services. The ARDP node may send a service response message including the unique entry in the database of services for the user in need of emergency assistance. The emergency responder's computing device may use the information in the service response message to plot the location of the user in need of emergency assistance onto a map and send assistance to that location as needed.

In similar manners, any type service, physical and/or virtual, that may be provisioned directly between two computing devices may be enabled by the various embodiments. A computing device providing the service may publish to an ARDP node, and a computing device requesting a service may use the information from the ARDP node to communicate directly with the computing device providing the service to receive the service. Such services may include virtual reality services, vehicle-to-vehicle communications, content delivery services, network virtualization services, radio relay services, personal services, retail shopping services, contracting services, Internet-of-Things (IoT) services, etc. In various embodiments, the demand and resource relationship may serve as a building block to broker any type service via an ARDP node.

FIG. 1 is a system block diagram of a portion of a network 100 including computing devices 103, 104, 107, and 110, in communication with an anycast resource discovery protocol (ARDP) node server 123 according to various embodiments. The network 100 may be any type network, such as an ISP network. The ARDP node server 123 may be a server within the network 100 configured to receive and respond to anycast messages. The ARDP node server 123 may be configured to store a database of services published to the ARDP node server 123. For example, the ARDP node server 123 may be an Apache server in a layer of an ISP network. The computing devices 103, 104, 107, and 110 and the ARDP node server 123 may be connected to one another, such as by a wired and/or wireless network connections, such as the Internet, and via those connections the computing devices 103, 104, 107, and 110 and the ARDP node server 123 may exchange data with one another.

In various embodiments, the computing devices 103, 104, 107, and 110 may be client computing devices and/or resource computing devices. Resource computing devices may be any computing device associated with providing a physical and/or virtual service. For example, a computing device 104 of a taxi 125 being operated by a taxi driver 106 may be a resource computing device associated with providing a taxi service. As another example, a computing device 107 of a restaurant 126 being operated by a food service worker 108 may be a resource computing device associated with providing a food delivery service. As a further example, a server 110 operating as a game server hosting a game may be a resource computing device associated with providing a gaming service. Client computing devices may be any computing device associated with receiving a physical and/or virtual service. For example, a computing device 103 of a user 102 desiring to receive a service may be a client computing device. Resource computing devices may send anycast resource publication messages to the ARDP node server 123 to announce the services those resource computing devices may provide. Client computing devices may send anycast service request messages to the ARDP node server 123 to discover the services resource computing devices have announced to the ARDP node server 123.

Figure 2:
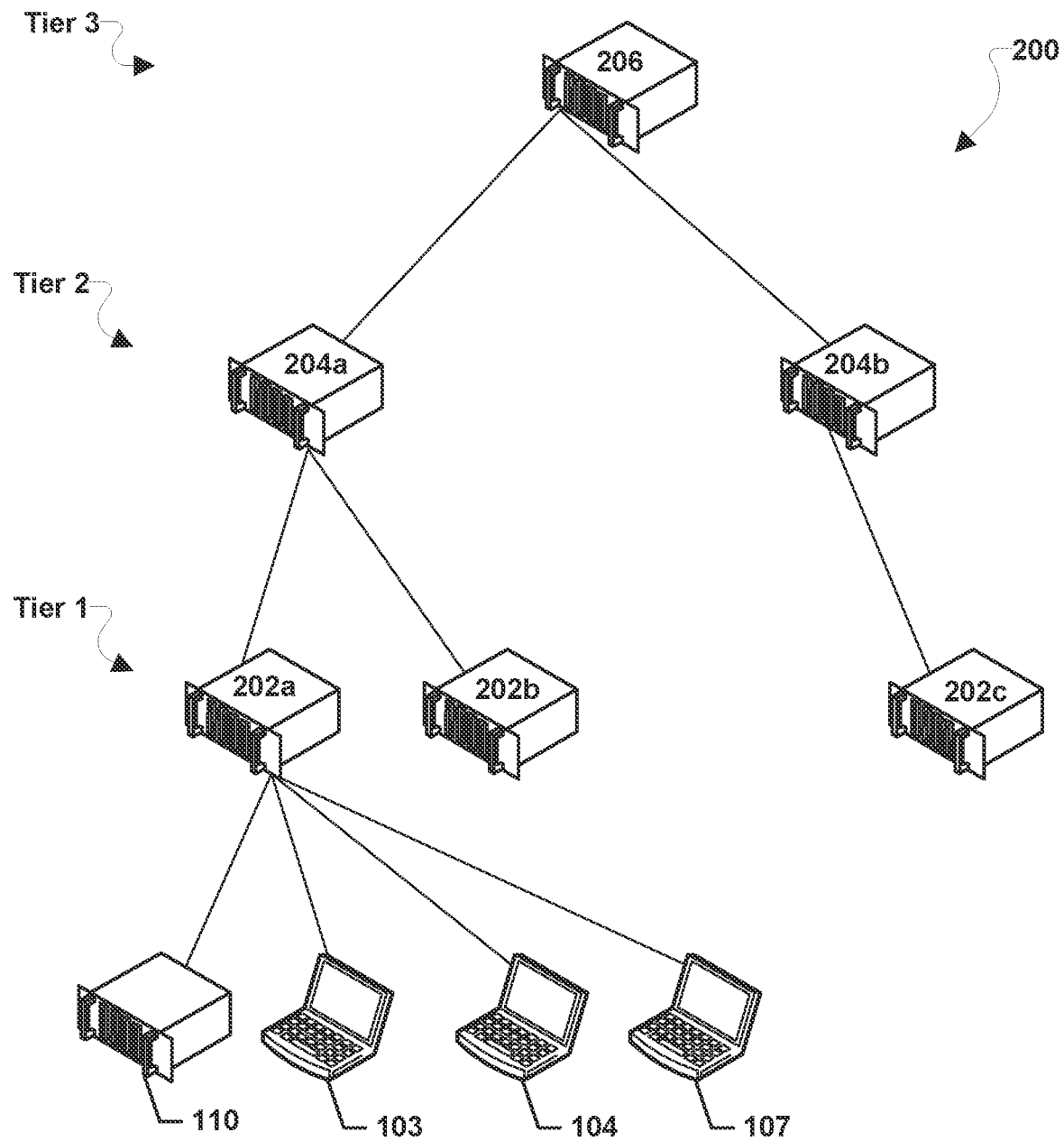
FIG. 2 is a system block diagram illustrating interconnections between computing devices and ARDP nodes in a network according to various embodiments.

FIG. 2 is a system block diagram illustrating interconnections between computing devices 103, 104, 107, and 110 and ARDP nodes 202a, 202b, 202c, 204a, 204b, and 206 in a network 200, such as an ISP network, according to various embodiments. With reference to FIGS. 1 and 2, the network 200 may include various network pathways that represent hardware and/or software connections between computing devices 103, 104, 107, and 110 and ARDP nodes 202a, 202b, 202c, 204a, 204b, and 206. For example, computing devices 103, 104, 107, and 110 may connect to ARDP node 202a. The ARDP nodes 202a, 202b, 202c, 204a, 204b, and 206 may be ARDP node servers, such as ARDP node server 123 discussed with reference to FIG. 1, configured to receive and respond to anycast messages, as well as store a database of services. The network 200 may be arranged in tiered layers, such as core layers, distribution layers, and access layers. Access layers may be the layers to which computing devices connect and distribution layers may connect access layers to core layers. The cost associated with transporting content may grow as content is moved across more layers of the network. For example, the cost of carrying content at the core layer may be lower than the cost of carrying content from the core layer, through the distribution layers, and across the access layers to computing devices. Additionally, the latency with transporting content may grow as content is moved across more layers of the network. For example, the latency of carrying content in the same layer may be lower than the latency of carrying content across different layers.

The ARDP nodes 202a, 202b, 202c, 204a, 204b, and 206 may be distributed throughout the network in three tiers, Tier 1, Tier 2, and Tier 3. For example, Tier 1 may include ARDP nodes 202a, 202b, and 202c. The tier 1 ARDP nodes 202a, 202b, and 202c may be located within the network closest to the computing devices 103, 104, 107, and 110. Tier 2 may include ARDP nodes 204a and 204b and Tier 3 may include ARDP node 206. The tier 3 ARDP node 206 may be located closer to the interconnects other networks, such as content delivery networks, other ISP networks, etc., than the tier 2 ARDP nodes 204a and 204b which may be located between the tier 3 and tier 1. The ARDP nodes 202a, 202b, 202c, 204a, 204b, and 206 may exchange data with one another, as well as computing devices 103, 104, 107, and 110, via connections in the network 200 and may exchange messages according to various routing protocols, such as the Border Gateway Protocol (BGP), etc. A server at any tier 1, 2, or 3 in the network 200 may be configured as an ARDP node, however, tier 1 ARDP nodes may provide the lowest latency and highest bandwidth services to connected computing devices. In various embodiments, computing devices connected to a specific ARDP node, for example computing devices 103, 104, 107, and 110 connected to ARDP node 202a may be local computing devices to one another and considered to provide local services to one another.

In various embodiments, the ARDP nodes 202a, 202b, 202c, 204a, 204b, and 206 may be discoverable via anycast messages. As an example, a resource computing device 110 may send an anycast resource publication message to ARDP node 202a. As another example, a client computing device 103 may send an anycast service request message to ARDP node 202a. In some embodiments, the addresses of the ARDP nodes 202a, 202b, 202c, 204a, 204b, and 206 may be pre-distributed to computing devices 103, 104, 107, and/or 110. In some embodiments, the addresses of the ARDP nodes 202a, 202b, 202c, 204a, 204b, and 206 may be discoverable by the computing devices 103, 104, 107, and/or 110 via anycast discovery messages.

Figure 3:
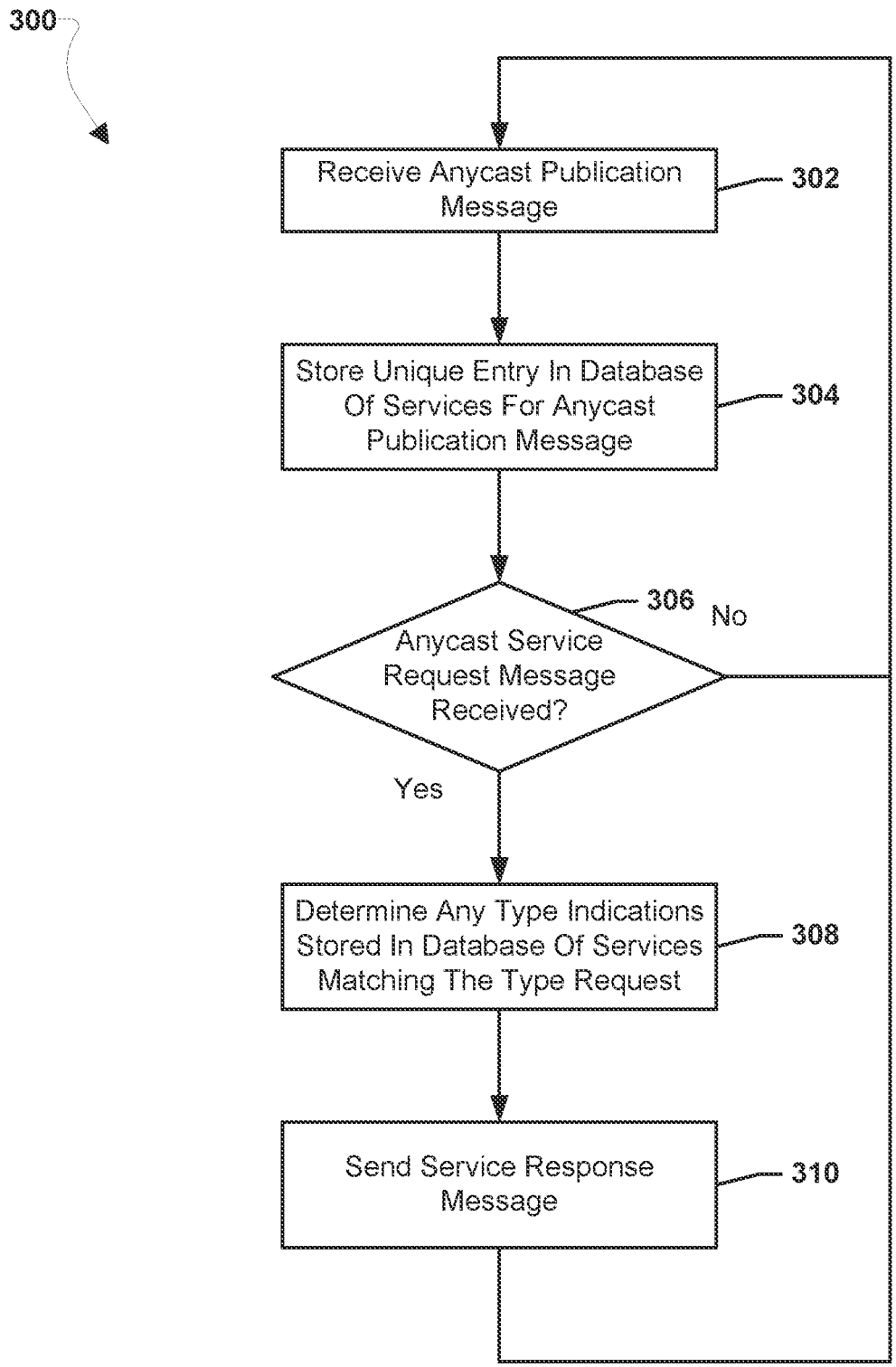
FIG. 3 is a process flow diagram illustrating an embodiment method for anycast resource discovery.

FIG. 3 illustrates an embodiment method 300 for anycast resource discovery. In various embodiments, the operations of method 300 may be performed by a processor an ARDP node server, such as ARDP node servers 123, 202a, 202b, 202c, 204a, 204b, and 206.

With reference to FIGS. 1-3, in block 302 the ARDP node server may receive an anycast publication message. In various embodiments, anycast publication messages may be anycast messages received from resource computing devices. In various embodiments, anycast resource publication messages may include information associated with the resource computing device and/or the service associated with the resource computing device. For example, anycast resource publication messages may include an identifier of the service and/or computing device, a type indication for the service, a subtype indication for the service, a delivery indication for the service, an Internet Protocol (IP) address indication for the resource computing device, a port indication for the resource computing device, and/or a format indication for the service. Anycast resource publication messages may further include a location of the resource computing device, such as a latitude and longitude determined using the Global Positioning System (GPS) or other systems, and/or a geofence associated with the service and/or resource computing device. The geofence may be an indication of a location, such as a latitude and longitude, and a radius extending from the location. Other type geofences, such as geographic indications (e.g., states, counties, towns, zip codes, etc.), street indications (e.g., intersection names, etc.), or any other type geofence indication may be substituted in various embodiments for location and radius indications. Anycast resource publication messages may further include keys for a service and/or resource computing device. A key may be a unique code associated with a service and/or resource computing device. A key may uniquely identify the ARDP node server to which the anycast resource publication message was sent.

In block 304 the ARDP node server may store a unique entry in a database of services for the anycast publication message. In various embodiments, the database of services may include a unique entry for each anycast resource publication message received by the ARDP node server. In this manner, the ARDP node server may generate a listing of local services offered by resource computing devices connected to the ARDP node server. FIG. 7 discussed below illustrates an example of unique entries in a database of services.

In determination block 306 the ARDP node server may determine whether any anycast service request message is received. Anycast service request messages may be anycast messages received from client computing devices connected to the ARDP node server. In various embodiments, anycast service request messages may indicate a type request for a service. A type request may be a code or other indication corresponding to a type indication of a service the client computing device is attempting to discovery availability for. In various embodiments, an anycast service request message may further include one or more other criteria for a service, such as a subtype request, a delivery request, a format request, etc. In response to determining that an anycast service request message is not received (i.e., determination block 306="No"), the ARDP node server may return to block 302 to await a next anycast publication message.

In response to determining that an anycast service request message is received (i.e., determination block 306="Yes"), in block 308 the ARDP node server may determine any type indications stored in the database of services matching the type request. In various embodiments, the ARDP node server may be configured to search the database of services based on one or more elements in the unique entries and determine matches between the one or more elements in the unique entries and various criteria. In this manner, an ARDP node server may receive an anycast service request message and determine whether any type indications or other elements for a service stored in the database of services match the type request or other criteria for a service included in the anycast server request message.

In block 310 the ARDP node server may send the service response message. In response to determining matches, the ARDP node server may send a service response message to the client computing device including the determined matching unique entries. In this manner, the service response message may include information associated with resource computing devices and/or services associated with resource computing devices. For example, service response messages may include an identifier of the service and/or computing device, a type indication for the service, a subtype indication for the service, a delivery indication for the service, an Internet Protocol (IP) address indication for the resource computing device, a port indication for the resource computing device, a format indication for the service, a location of the resource computing device, a geofence associated with the service and/or resource computing device, and/or keys for a service and/or resource computing device.

Figure 4:
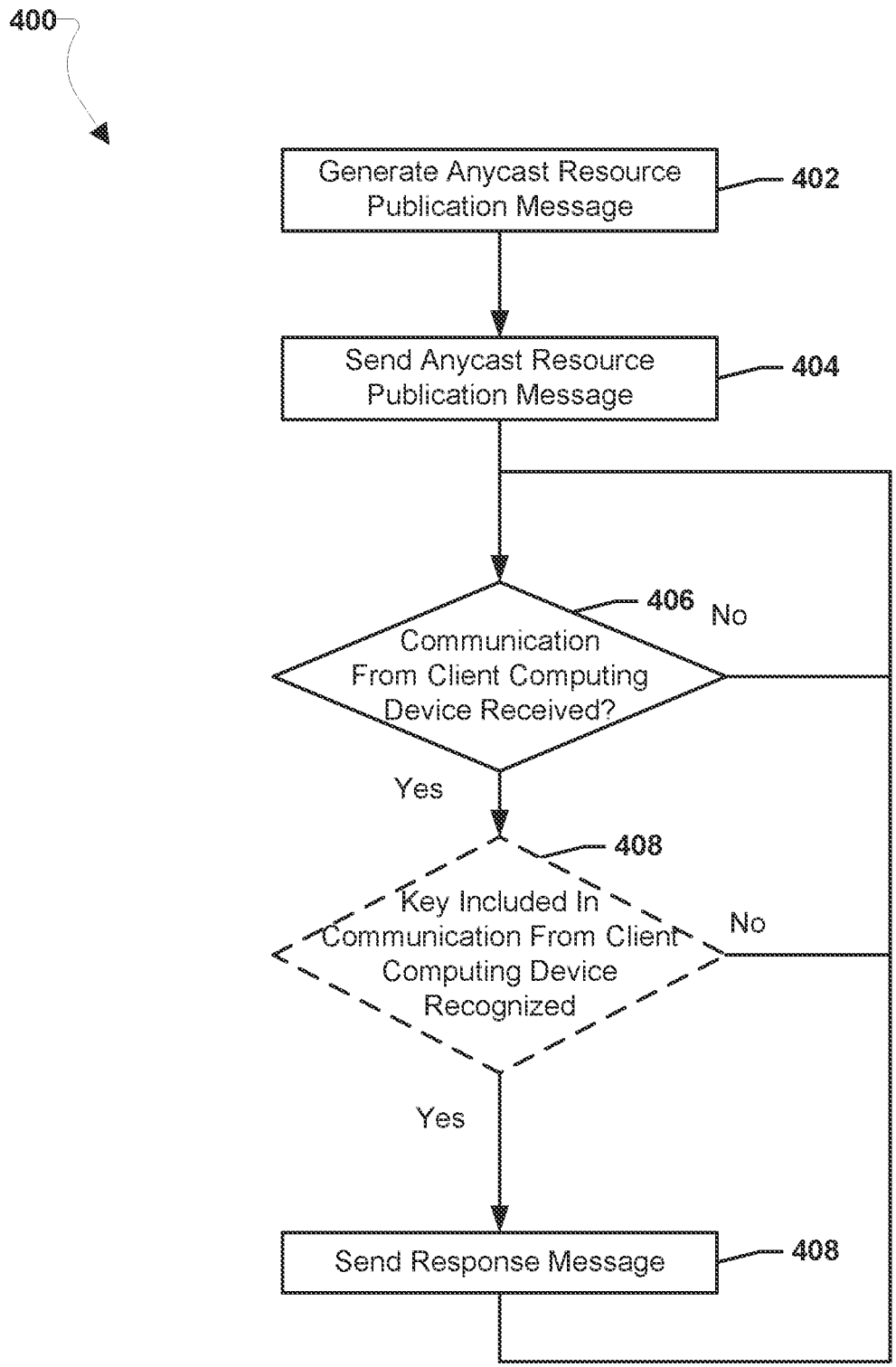
FIG. 4 is a process flow diagram illustrating an embodiment method for anycast resource provisioning.

FIG. 4 illustrates an embodiment method 400 for anycast resource provisioning. In various embodiments, the operations of method 400 may be performed by a processor a resource computing device, such as computing devices 103, 104, 107, and 110.

With reference to FIGS. 1-4, in block 402 the processor of the resource computing device may generate an anycast resource publication message. In various embodiments, anycast resource publication messages may include information associated with the resource computing device and/or the service associated with the resource computing device. For example, anycast resource publication messages may include an identifier of the service and/or computing device, a type indication for the service, a subtype indication for the service, a delivery indication for the service, an Internet Protocol (IP) address indication for the resource computing device, a port indication for the resource computing device, and/or a format indication for the service. Anycast resource publication messages may further include a location of the resource computing device, such as a latitude and longitude determined using the Global Positioning System (GPS) or other systems, and/or a geofence associated with the service and/or resource computing device. The geofence may be an indication of a location, such as a latitude and longitude, and a radius extending from the location. Other type geofences, such as geographic indications (e.g., states, counties, towns, zip codes, etc.), street indications (e.g., intersection names, etc.), or any other type geofence indication may be substituted in various embodiments for location and radius indications. Anycast resource publication messages may further include keys for a service and/or resource computing device. A key may be a unique code associated with a service and/or resource computing device. A key may uniquely identify the ARDP node server to which the anycast resource publication message was sent.

In block 404 the processor of the resource computing device may send the anycast resource publication message. For example, the processor of the resource computing device may send the anycast resource publication message to an address associated with ARDP node servers in a network.

In determination block 406 the processor of the resource computing device may determine whether a communication from a client computing device is received. In various embodiments, a client computing device may use the information provides to the ARDP node server to send a communication to the resource computing device. The communication may be sent directly from the client computing device to the resource computing device without any proxy support or further connection brokering from the ARDP node server. For example, the client computing device may send a communication to a port of the resource computing device corresponding to the port indication in the anycast resource publication message. In response to determining that no communication from a client computing device is received (i.e., determination block 406="No"), the processor of the resource computing device may continue to monitor for and await a communication in block 406.

In response to determining that a communication from a client computing device is received (i.e., determination block 406="Yes"), in optional determination block 408 the processor of the resource computing device may determine whether a key included in the communication from the client computing device is recognized. The key in the communication may be compared to the key included in the anycast resource publication message. A matching key may indicate the client computing device obtained the information about the service and/or resource computing device from the same ARDP node server the resource computing device sent the anycast resource publication message to and that the client computing device is a local computing device to the resource computing device. This key check process may reduce the chance of malicious attacks on services and prevent non-local use of services. In response to the key not being recognized (i.e., optional determination block 408="No"), the processor of the resource computing device may continue to monitor for and await a communication in block 406. In various embodiments, optional determination block 408 may be optional as not all services and/or resource computing devices may utilize keys.

In response to determining that the key included in the communication from the client computing device is recognized (i.e., optional determination block 408="Yes") or in response to receiving the communication when a key check is not performed, in block 408 the processor of the resource computing device may send a response message to the client computing device. The response message may be sent directly from the resource computing device to the client computing device without any proxy support or further connection brokering from the ARDP server. In this manner, the client computing device and the resource computing device may establish a connection brokered by those two computing devices directly without further involvement by the ARDP node to provision and receive the service.

Figure 5:
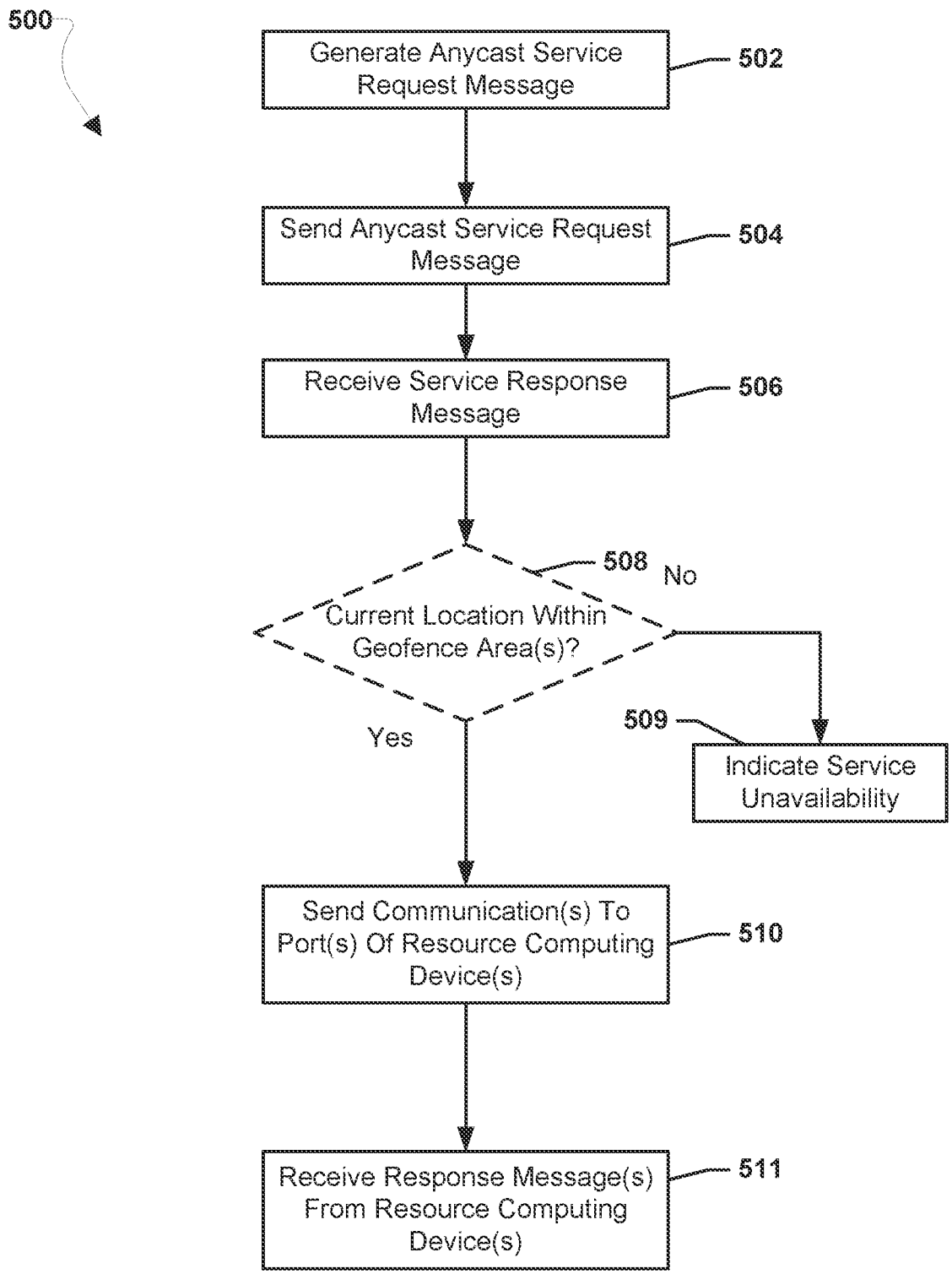
FIG. 5 is a process flow diagram illustrating an embodiment method for anycast resource discovery.

FIG. 5 illustrates an embodiment method 500 for anycast resource discovery. In various embodiments, the operations of method 500 may be performed by a processor a client computing device, such as computing devices 103, 104, 107, and 110.

With reference to FIGS. 1-5, in block 502 the processor of the client computing device may generate an anycast service request message. In various embodiments, anycast service request messages may indicate a type request for a service. A type request may be a code or other indication corresponding to a type indication of a service the client computing device is attempting to discovery availability for. In various embodiments, an anycast service request message may further include one or more other criteria for a service, such as a subtype request, a delivery request, a format request, etc.

In block 504 the processor of the client computing device may send the anycast service request message. For example, the processor of the client computing device may send the anycast service request message to an address associated with ARDP node servers in a network.

In block 506 the processor of the client computing device may receive a service response message. In various embodiments, the service response message may include information associated with resource computing devices and/or services associated with resource computing devices. For example, service response messages may include an identifier of the service and/or computing device, a type indication for the service, a subtype indication for the service, a delivery indication for the service, an Internet Protocol (IP) address indication for the resource computing device, a port indication for the resource computing device, a format indication for the service, a location of the resource computing device, a geofence associated with the service and/or resource computing device, and/or keys for a service and/or resource computing device.

In optional determination block 508 the processor of the client computing device may determine whether the current location is within one or more geofence areas. The service response message may include a geofence that may be an indication of a location, such as a latitude and longitude, and a radius extending from the location. Other type geofences, such as geographic indications (e.g., states, counties, towns, zip codes, etc.), street indications (e.g., intersection names, etc.), or any other type geofence indication may be substituted in various embodiments for location and radius indications. The processor of the client computing device may compare its current location, such as determined by a GPS receiver or other location determination system, to the area defined by the geofence. Location inside the geofence may indicate the service is available and a location outside the geofence may indicate the service is not available to the client computing device. In response to determining that the current location is outside the geofence area (i.e., optional determination block 508="No"), in block 509 the client computing device may indicate services are unavailable. Optional determination block 508 may be optional as not all services may be restricted by a geofence.

In response to determining that the current location is inside one or more geofence area (i.e., optional determination block 508="Yes") or in response to receiving the service response message when geofence checking is not performed, in block 510 the processor of the client computing device may send one or more communications to one or more ports of one or more resource computing devices. In various embodiments, the client computing device may use the information in the service response message to send a communication to one or more resource computing device. The communication may be sent directly from the client computing device to the resource computing device without any proxy support or further connection brokering from the ARDP node server. For example, the client computing device may send a communication to a port of the resource computing device corresponding to the port indication in the service response message. As a specific example, the client computing device may select a resource computing device from the service response message to provide a service, and may send a message routed directly to that resource computing device using the IP address and port indications in the service response message. The message may be a join request or other type message configured to enable the client computing device to receive the service from the resource computing device.

In block 511 the processor of the client computing device may receive one or more response messages from one or more computing devices. The response message may be received directly from the resource computing device without any proxy support or further connection brokering from the ARDP server. In this manner, the client computing device and the resource computing device may establish a connection brokered by those two computing devices directly without further involvement by the ARDP node to provision and receive the service.

Figure 6:
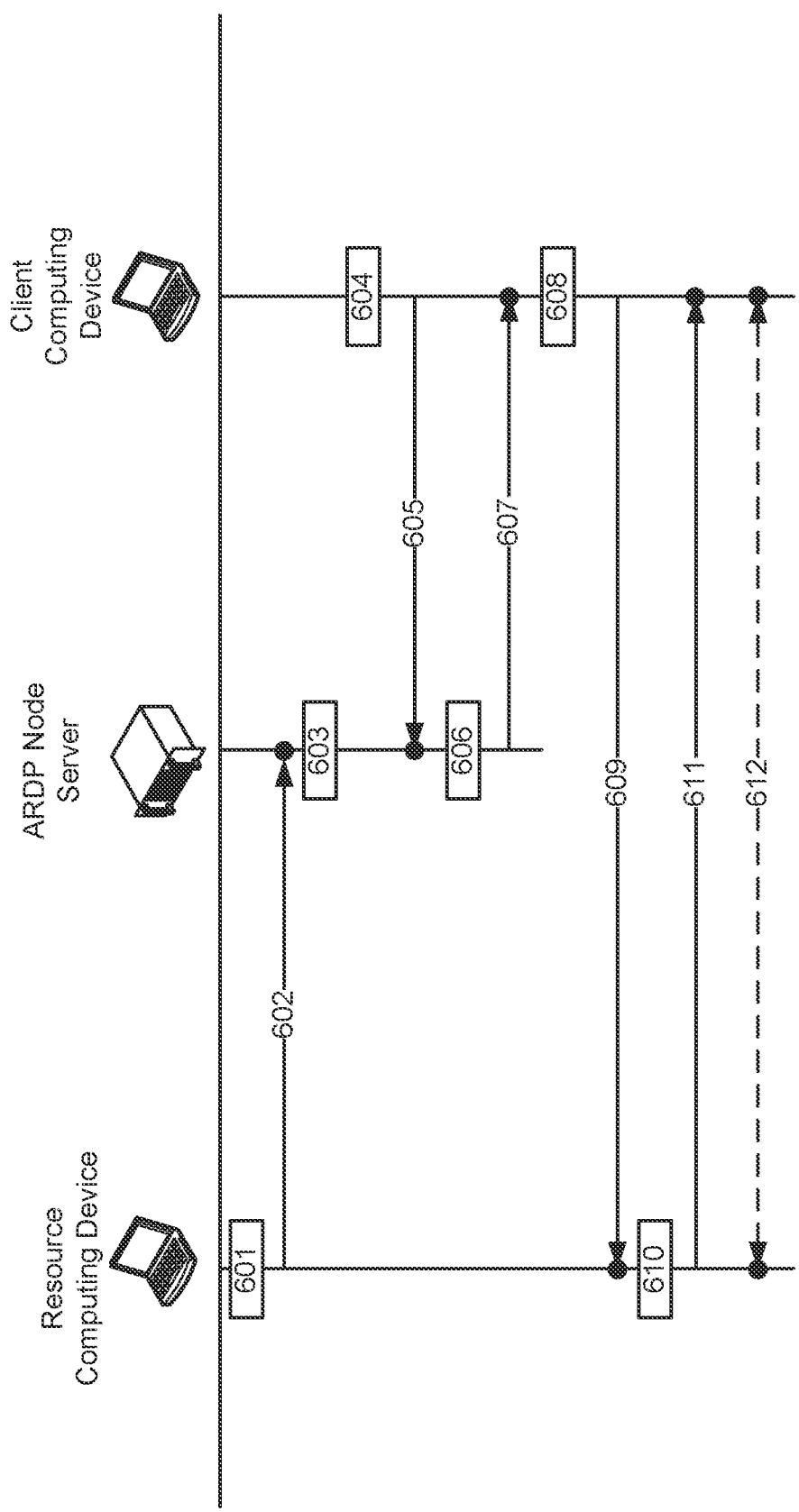
FIG. 6 is a call flow diagram illustrating an embodiment method for anycast resource discovery.

FIG. 6 is a call flow diagram illustrating an embodiment method for anycast resource discovery. In various embodiments, the operations and interactions illustrated in FIG. 6 may be performed by a processor of an ARDP node server, such as ARDP node servers 123, 202a, 202b, 202c, 204a, 204b, and 206, and a processor of a computing device, such as computing device 103, 104, 107, and 110. The operations and interactions illustrated in FIG. 6 may be performed in conjunction with the operations of any of methods 300, 400, and/or 500 described above.

With reference to FIGS. 1-6, in operation 601 a resource computing device may generate an anycast resource publication message. The anycast resource publication message may be generated in response to a user of the resource computing device desiring to offer a service in a network. In operation 602 the resource computing device may send the anycast resource publication message to an ARDP node server. In operation 603 the ARDP node server may store a unique entry in a database of services for the received anycast publication message.

In operation 604 a client computing device may generate an anycast service request message. The anycast service request message may be generated by the client computing device in response to a user of the client computing device desiring to receive a service in a network. In operation 605 the client computing device may send the anycast service request message to the ARDP node server. In operation 606 the ARDP node server may determine whether any type indications or other elements for a service stored in the database of services match the type request or other criteria for a service included in the anycast server request message. In response to determining matches, the ARDP node server may send a service response message to the client computing device including the determined matching unique entries in operation 607.

In operation 608 the client computing device may select a service from the matches received from the ARDP node server offered by the resource computing device and in operation 609 send a communication directly to the resource computing device. In operation 610 the resource computing device may perform a check on the communication, such as a key verification, and in operation 611 may send a response message to the client computing device to establish a connection. In operation 612 the client computing device and resource computing device may establish a connection brokered by those two computing devices directly without further involvement by the ARDP node server to provision and receive the service.

The operations illustrated in FIG. 6 may enable the direct provisioning of any services, physical and/or virtual, between two computing devices. A computing device providing the service may publish to an ARDP node, and a computing device requesting a service may use the information from the ARDP node to communicate directly with the computing device providing the service to receive the service. Such services may include taxi services, food delivery services, emergency services, local broadcast services, virtual reality services, vehicle-to-vehicle communications, content delivery services, network virtualization services, radio relay services, personal services, retail shopping services, contracting services, Internet-of-Things (IoT) services, etc.

FIG. 7 illustrates example unique entries in a database of services according to various embodiments. With reference to FIGS. 1-7, each unique entry may include various elements of information associated with services announced to the ARDP node server storing the database of services. For example, a unique entry may include an identifier 701 of the service and/or computing device associated with the service, a format indication for the service 703, a type indication for the service 704, a subtype indication for the service 706, a delivery indication for the service 708, an IP address indication for the resource computing device 709, a port indication for the resource computing device 710, a location of the resource computing device 711, a geofence associated with the service and/or resource computing device 712, and/or keys for a service and/or resource computing device 713.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 400, and 500 may be substituted for or combined with one or more operations of the methods 300, 400, and 500 and vice versa.

Figure 8:
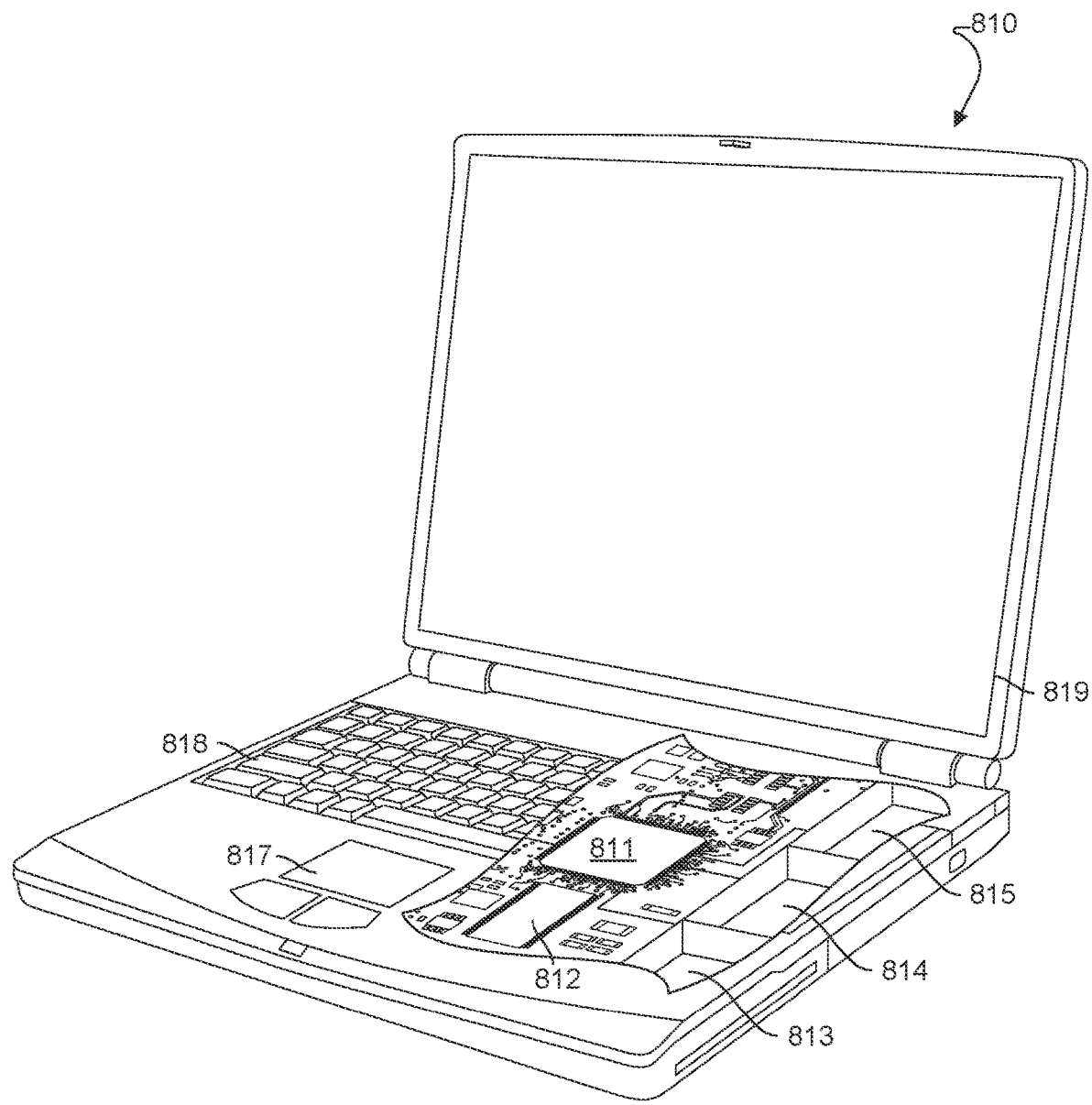
FIG. 8 is a component diagram of an example computing device suitable for use with various embodiments.

The various embodiments (including, but not limited to, embodiments discussed above with reference to FIGS. 1-7)

described above may also be implemented within a variety of computing devices, such as a laptop computer 810 as illustrated in FIG. 8. Many laptop computers include a touch pad touch surface 817 that serves as the computer's pointing device, and thus may receive drag, scroll, and flick gestures similar to those implemented on mobile computing devices equipped with a touch screen display and described above. A laptop computer 810 will typically include a processor 811 coupled to volatile memory 812 and a large capacity non-volatile memory, such as a disk drive 813 of Flash memory. The laptop computer 810 may also include a floppy disc drive 814 and a compact disc (CD) drive 815 coupled to the processor 811. The laptop computer 810 may also include a number of connector ports coupled to the processor 811 for establishing data connections or receiving external memory devices, such as a USB or FireWire® connector sockets, or other network connection circuits (e.g., interfaces) for coupling the processor 811 to a network. In a notebook configuration, the computer housing may include the touchpad 817, the keyboard 818, and the display 819 all coupled to the processor 811. Other configurations of the computing device may include a computer mouse or trackball coupled to the processor (e.g., via a USB input) as are well known, which may also be used in conjunction with the various embodiments.

Figure 9:
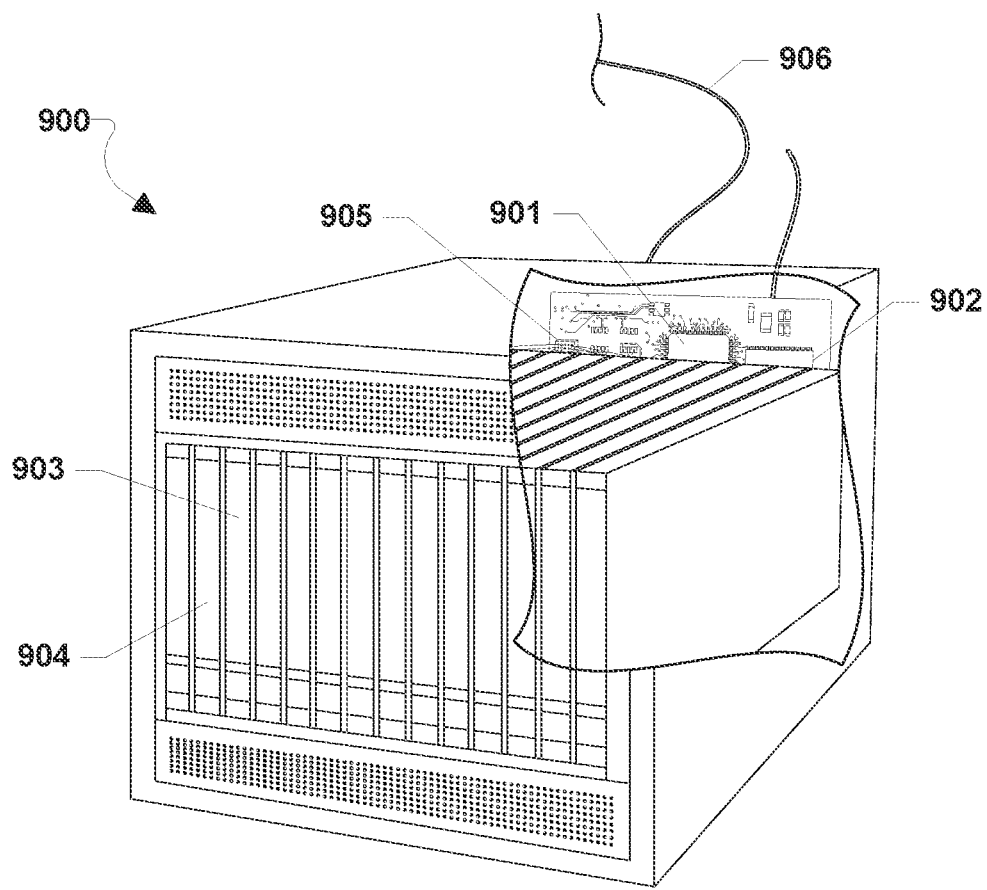
FIG. 9 is a component diagram of an example server suitable for use with the various embodiments.

Various embodiments (including, but not limited to, embodiments discussed above with reference to FIGS. 1-7) may be implemented on any of a variety of commercially available server devices, such as the server device 900 illustrated in FIG. 9. Such a server device 900 may include a processor 901 coupled to volatile memory 902 and a large capacity nonvolatile memory, such as a disk drive 903. The server device 900 may also include a floppy disc drive, compact disc (CD) or DVD disc drive 904 coupled to the processor 901. The server device 900 may also include network access ports 906 coupled to the processor 901 for establishing data connections with a network connection circuit 905 and a communication network (e.g., IP network) coupled to other communication system network elements.

The processors 811, 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 811, 901. The processors 811, 901 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 811, 901 including internal memory or removable memory plugged into the device and memory within the processors 811, 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for anycast resource discovery, comprising:
receiving, at an anycast resource discovery protocol (ARDP) node server, one or more anycast resource publication messages from one or more resource computing devices, each anycast resource publication message including an identifier, a type indication, a subtype indication, and an Internet Protocol (IP) address indication associated with the respective resource computing device sending that resource publication message;
storing, at the ARDP node server, a unique entry in a database of services for each received anycast resource publication message, each unique entry including the identifier, the type indication, the subtype indication, and the IP address indication of that respective received anycast resource publication message;
receiving, at the ARDP node server, an anycast service request message from a client computing device, the anycast service request message indicating at least a type request;
determining, by the ARDP node server, any type indications stored in the database of services matching the type request; and
sending, from the ARDP node server, a service response message to the client computing device, the service response message including the unique entries having type indications determined to match the type request.

2. The method of claim 1, wherein:
at least a portion of the one or more anycast resource publication messages further include location indications and geofence indications; and
the unique entries for the at least a portion of the one or more anycast resource publication messages include the location indications and the geofence indications.

3. The method of claim 1, wherein:
at least a portion of the one or more anycast resource publication messages further include keys; and
the unique entries for the at least a portion of the one or more anycast resource publication messages include the keys.

4. A method for anycast resource provisioning, comprising:
sending, from processor of a computing device, an anycast resource publication message to an anycast resource discovery protocol (ARDP) node server, the anycast resource publication message including an identifier, a type indication, a subtype indication, and an Internet Protocol (IP) address indication of the computing device.

5. The method of claim 4, wherein the anycast resource publication message further includes a key, the method further comprising:

receiving, at the processor of the computing device, a communication from a client computing device including the key; and
sending, from the processor of the computing device, a response message to the client computing device in response to receiving the communication from the client computing device and the key being included in the communication from the client computing device.

6. A method for anycast resource discovery, comprising:
sending, from a processor of a computing device, an anycast service request message to an anycast resource discovery protocol (ARDP) node server, the anycast service request message indicating at least a type request; and
receiving, at the processor of the computing device, a service response message from the ARDP node server, the service response message including an identifier, a type indication, a subtype indication, and an Internet Protocol (IP) address indication of at least one resource computing device and the type indication matching the type request.

7. The method of claim 6, wherein the service response message further includes a key of the at least one resource computing device, the method further comprising:
sending, from the processor of the computing device, a communication including the key to a port of the at least one resource computing device.

8. The method of claim 7, wherein:
the service response message further includes a location indication and a geofence indication of the at least one resource computing device; and
sending, from the processor of the computing device, the communication including the key to the port of the at least one resource computing device comprises:
determining whether a current location of the computing device is within an area defined by the location indication and the geofence indication; and
sending, from the processor of the computing device, the communication including the key to the port of the at least one resource computing device in response to determining the current location of the computing device is within the area defined by the location indication and the geofence indication.

9. A method for anycast resource discovery, comprising:
receiving, at an anycast resource discovery protocol (ARDP) node server, one or more anycast resource publication messages from one or more resource computing devices, each anycast resource publication message including an identifier, a type indication, a delivery indication, and an Internet Protocol (IP) address indication associated with the respective resource computing device sending that resource publication message;
storing, at the ARDP node server, a unique entry in a database of services for each received anycast resource publication message, each unique entry including the identifier, the type indication, the delivery indication, and the IP address indication of that respective received anycast resource publication message;
receiving, at the ARDP node server, an anycast service request message from a client computing device, the anycast service request message indicating at least a type request;
determining, by the ARDP node server, any type indications stored in the database of services matching the type request; and sending, from the ARDP node server, a service response message to the client computing device, the service response message including the unique entries having type indications determined to match the type request.

10. The method of claim 9, wherein:
at least a portion of the one or more anycast resource publication messages further include location indications and geofence indications; and
the unique entries for the at least a portion of the one or more anycast resource publication messages include the location indications and the geofence indications.

11. The method of claim 9, wherein:
at least a portion of the one or more anycast resource publication messages further include keys; and
the unique entries for the at least a portion of the one or more anycast resource publication messages include the keys.

12. A method for anycast resource provisioning, comprising:
sending, from processor of a computing device, an anycast resource publication message to an anycast resource discovery protocol (ARDP) node server, the anycast resource publication message including an identifier, a type indication, a delivery indication, and an Internet Protocol (IP) address indication of the computing device.

13. The method of claim 12, wherein the anycast resource publication message further includes a key, the method further comprising:
receiving, at the processor of the computing device, a communication from a client computing device including a key; and
sending, from the processor of the computing device, a response message to the client computing device in response to receiving the communication from the client computing device and the key being included in the communication from the client computing device.

14. A method for anycast resource discovery, comprising:
sending, from a processor of a computing device, an anycast service request message to an anycast resource discovery protocol (ARDP) node server, the anycast service request message indicating at least a type request; and
receiving, at the processor of the computing device, a service response message from the ARDP node server, the service response message including an identifier, a type indication, a delivery indication, and an Internet Protocol (IP) address indication of at least one resource computing device and the type indication matching the type request.

15. The method of claim 14, wherein the service response message further includes a key of the at least one resource computing device, the method further comprising:
sending, from the processor of the computing device, a communication including the key to a port of the at least one resource computing device.

16. The method of claim 15, wherein:
the service response message further includes a location indication and a geofence indication of the at least one resource computing device; and
sending, from the processor of the computing device, the communication including the key to the port of the at least one resource computing device comprises:
determining whether a current location of the computing device is within an area defined by the location indication and the geofence indication; and sending, from the processor of the computing device, the communication including the key to the port of the at least one resource computing device in response to determining the current location of the computing device is within the area defined by the location indication and the geofence indication.

17. An anycast resource discover protocol (ARDP) node server, comprising:
a processor configured with processor-executable instructions to perform operations comprising:
receiving one or more anycast resource publication messages from one or more resource computing devices, each anycast resource publication message including an identifier, a type indication, a subtype indication, and an Internet Protocol (IP) address indication associated with the respective resource computing device sending that resource publication message;
storing a unique entry in a database of services for each received anycast resource publication message, each unique entry including the identifier, the type indication, the subtype indication, and the IP address indication of that respective received anycast resource publication message;
receiving an anycast service request message from a client computing device, the anycast service request message indicating at least a type request;
determining any type indications stored in the database of services matching the type request; and
sending a service response message to the client computing device, the service response message including the unique entries having type indications determined to match the type request.

18. The ARDP node server of claim 17, wherein the processor is configured with processor-executable instructions to perform operations such that:
at least a portion of the one or more anycast resource publication messages further include location indications and geofence indications; and
the unique entries for the at least a portion of the one or more anycast resource publication messages include the location indications and the geofence indications.

19. The ARDP node server of claim 17, wherein the processor is configured with processor-executable instructions to perform operations such that:
at least a portion of the one or more anycast resource publication messages further include keys; and
the unique entries for the at least a portion of the one or more anycast resource publication messages include the keys.

20. A device, comprising:
a processor configured with processor-executable instructions to perform operations comprising:
sending an anycast resource publication message to an anycast resource discovery protocol (ARDP) node server, the anycast resource publication message including an identifier, a type indication, a subtype indication, and an Internet Protocol (IP) address indication of the computing device.

21. The device of claim 20, wherein:
the processor is configured with processor-executable instructions to perform operations such that the anycast resource publication message further includes a key; and
the processor is configured with processor-executable instructions to perform operations further comprising:

receiving a communication from a client computing device including the key; and sending a response message to the client computing device in response to receiving the communication from the client computing device and the key being included in the communication from the client computing device.

22. A device, comprising:
a processor configured with processor-executable instructions to perform operations comprising:
sending an anycast service request message to an anycast resource discovery protocol (ARDP) node server, the anycast service request message indicating at least a type request; and
receiving a service response message from the ARDP node server, the service response message including an identifier, a type indication, a subtype indication, and an Internet Protocol (IP) address indication of at least one resource computing device and the type indication matching the type request.

23. The device of claim 22, wherein:
the processor is configured with processor-executable instructions to perform operations such that the service response message further includes a key of the at least one resource computing device; and
the processor is configured with processor-executable instructions to perform operations further comprising:
sending a communication including the key to a port of the at least one resource computing device.

24. The device of claim 23, wherein the processor is configured with processor-executable instructions to perform operations such that:
the service response message further includes a location indication and a geofence indication of the at least one resource computing device; and
sending the communication including the key to the port of the at least one resource computing device comprises:
determining whether a current location of the computing device is within an area defined by the location indication and the geofence indication; and
sending the communication including the key to the port of the at least one resource computing device in response to determining the current location of the computing device is within the area defined by the location indication and the geofence indication.

25. An anycast resource discovery protocol (ARDP) node server, comprising:
a processor configured with processor-executable instructions to perform operations comprising:
receiving one or more anycast resource publication messages from one or more resource computing devices, each anycast resource publication message including an identifier, a type indication, a delivery indication, and an Internet Protocol (IP) address indication associated with the respective resource computing device sending that resource publication message;
storing a unique entry in a database of services for each received anycast resource publication message, each unique entry including the identifier, the type indication, the delivery indication, and the IP address indication of that respective received anycast resource publication message;
receiving an anycast service request message from a client computing device, the anycast service request message indicating at least a type request;

determining any type indications stored in the database of services matching the type request; and
sending a service response message to the client computing device, the service response message including the unique entries having type indications determined to match the type request.

26. The ARDP node server of claim 25, wherein the processor is configured with processor-executable instructions to perform operations such that:
at least a portion of the one or more anycast resource publication messages further include location indications and geofence indications; and
the unique entries for the at least a portion of the one or more anycast resource publication messages include the location indications and the geofence indications.

27. The ARDP node server of claim 25, wherein the processor is configured with processor-executable instructions to perform operations such that:
at least a portion of the one or more anycast resource publication messages further include keys; and
the unique entries for the at least a portion of the one or more anycast resource publication messages include the keys.

28. A device, comprising:
a processor configured with processor-executable instructions to perform operations comprising:
sending an anycast resource publication message to an anycast resource discovery protocol (ARDP) node server, the anycast resource publication message including an identifier, a type indication, a delivery indication, and an Internet Protocol (IP) address indication of the computing device.

29. The device of claim 28, wherein:
the processor is configured with processor-executable instructions to perform operations such that the anycast resource publication message further includes a key; and
the processor is configured with processor-executable instructions to perform operations further comprising:
receiving a communication from a client computing device including a key; and
sending a response message to the client computing device in response to receiving the communication from the client computing device and the key being included in the communication from the client computing device.

30. A device, comprising:
a processor configured with processor-executable instructions to perform operations comprising:
sending an anycast service request message to an anycast resource discovery protocol (ARDP) node server, the anycast service request message indicating at least a type request; and
receiving a service response message from the ARDP node server, the service response message including an identifier, a type indication, a delivery indication, and an Internet Protocol (IP) address indication of at least one resource computing device and the type indication matching the type request.

31. The device of claim 30, wherein:
the processor is configured with processor-executable instructions to perform operations such that the service response message further includes a key of the at least one resource computing device; and
the processor is configured with processor-executable instructions to perform operations further comprising:

sending a communication including the key to a port of the at least one resource computing device.

32. The device of claim 31, wherein the processor is configured with processor-executable instructions to perform operations such that:
the service response message further includes a location indication and a geofence indication of the at least one resource computing device; and
sending the communication including the key to the port of the at least one resource computing device comprises:
determining whether a current location of the computing device is within an area defined by the location indication and the geofence indication; and
sending the communication including the key to the port of the at least one resource computing device in response to determining the current location of the computing device is within the area defined by the location indication and the geofence indication.

33. A non-transitory processor readable medium having stored thereon processor-executable instructions configured to cause a processor of an anycast resource discovery protocol (ARDP) node server to perform operations comprising:
receiving one or more anycast resource publication messages from one or more resource computing devices, each anycast resource publication message including an identifier, a type indication, a subtype indication, and an Internet Protocol (IP) address indication associated with the respective resource computing device sending that resource publication message;
storing a unique entry in a database of services for each received anycast resource publication message, each unique entry including the identifier, the type indication, the subtype indication, and the IP address indication of that respective received anycast resource publication message;
receiving an anycast service request message from a client computing device, the anycast service request message indicating at least a type request;
determining any type indications stored in the database of services matching the type request; and
sending a service response message to the client computing device, the service response message including the unique entries having type indications determined to match the type request.

34. The non-transitory processor readable medium of claim 33, wherein the stored processor-executable instructions are configured to cause the processor of the ARDP node server to perform operations such that:
at least a portion of the one or more anycast resource publication messages further include location indications and geofence indications; and
the unique entries for the at least a portion of the one or more anycast resource publication messages include the location indications and the geofence indications.

35. The non-transitory processor readable medium of claim 33, wherein the stored processor-executable instructions are configured to cause the processor of the ARDP node server to perform operations such that:
at least a portion of the one or more anycast resource publication messages further include keys; and
the unique entries for the at least a portion of the one or more anycast resource publication messages include the keys.

36. A non-transitory processor readable medium having stored thereon processor-executable instructions configured to cause a processor of a device to perform operations comprising:
sending an anycast resource publication message to an anycast resource discovery protocol (ARDP) node server, the anycast resource publication message including an identifier, a type indication, a subtype indication, and an Internet Protocol (IP) address indication of the computing device.

37. The non-transitory processor readable medium of claim 36, wherein:
the stored processor-executable instructions are configured to cause a processor of a device to perform operations such that the anycast resource publication message further includes a key; and
the stored processor-executable instructions are configured to cause a processor of a device to perform operations further comprising:
receiving a communication from a client computing device including the key; and
sending a response message to the client computing device in response to receiving the communication from the client computing device and the key being included in the communication from the client computing device.

38. A non-transitory processor readable medium having stored thereon processor-executable instructions configured to cause a processor of a device to perform operations comprising:
sending an anycast service request message to an anycast resource discovery protocol (ARDP) node server, the anycast service request message indicating at least a type request; and
receiving a service response message from the ARDP node server, the service response message including an identifier, a type indication, a subtype indication, and an Internet Protocol (IP) address indication of at least one resource computing device and the type indication matching the type request.

39. The non-transitory processor readable medium of claim 38, wherein:
the stored processor-executable instructions are configured to cause a processor of a device to perform operations such that the service response message further includes a key of the at least one resource computing device; and
the stored processor-executable instructions are configured to cause a processor of a device to perform operations further comprising:
sending a communication including the key to a port of the at least one resource computing device.

40. The non-transitory processor readable medium of claim 39, wherein the stored processor-executable instructions are configured to cause a processor of a device to perform operations such that:
the service response message further includes a location indication and a geofence indication of the at least one resource computing device; and
sending the communication including the key to the port of the at least one resource computing device comprises:
determining whether a current location of the computing device is within an area defined by the location indication and the geofence indication; and
sending the communication including the key to the port of the at least one resource computing device in response to determining the current location of the computing device is within the area defined by the location indication and the geofence indication.

41. A non-transitory processor readable medium having stored thereon processor-executable instructions configured to cause a processor of an anycast resource discovery protocol (ARDP) node server to perform operations comprising:
receiving one or more anycast resource publication messages from one or more resource computing devices, each anycast resource publication message including an identifier, a type indication, a delivery indication, and an Internet Protocol (IP) address indication associated with the respective resource computing device sending that resource publication message;
storing a unique entry in a database of services for each received anycast resource publication message, each unique entry including the identifier, the type indication, the delivery indication, and the IP address indication of that respective received anycast resource publication message;
receiving an anycast service request message from a client computing device, the anycast service request message indicating at least a type request;
determining any type indications stored in the database of services matching the type request; and
sending a service response message to the client computing device, the service response message including the unique entries having type indications determined to match the type request.

42. The non-transitory processor readable medium of claim 41, wherein the stored processor-executable instructions are configured to cause the processor of the ARDP node server to perform operations such that:
at least a portion of the one or more anycast resource publication messages further include location indications and geofence indications; and
the unique entries for the at least a portion of the one or more anycast resource publication messages include the location indications and the geofence indications.

43. The non-transitory processor readable medium of claim 41, wherein the stored processor-executable instructions are configured to cause the processor of the ARDP node server to perform operations such that:
at least a portion of the one or more anycast resource publication messages further include keys; and
the unique entries for the at least a portion of the one or more anycast resource publication messages include the keys.

44. A non-transitory processor readable medium having stored thereon processor-executable instructions configured to cause a processor of a device to perform operations comprising:
sending an anycast resource publication message to an anycast resource discovery protocol (ARDP) node server, the anycast resource publication message including an identifier, a type indication, a delivery indication, and an Internet Protocol (IP) address indication of the computing device.

45. The non-transitory processor readable medium of claim 44, wherein:
the stored processor-executable instructions are configured to cause a processor of a device to perform operations such that the anycast resource publication message further includes a key; and
the stored processor-executable instructions are configured to cause a processor of a device to perform operations further comprising:
receiving a communication from a client computing device including a key; and
sending a response message to the client computing device in response to receiving the communication from the client computing device and the key being included in the communication from the client computing device.

46. A non-transitory processor readable medium having stored thereon processor-executable instructions configured to cause a processor of a device to perform operations comprising:
sending an anycast service request message to an anycast resource discovery protocol (ARDP) node server, the anycast service request message indicating at least a type request; and
receiving a service response message from the ARDP node server, the service response message including an identifier, a type indication, a delivery indication, and an Internet Protocol (IP) address indication of at least one resource computing device and the type indication matching the type request.

47. The non-transitory processor readable medium of claim 46, wherein:
the stored processor-executable instructions are configured to cause a processor of a device to perform operations such that the service response message further includes a key of the at least one resource computing device; and
the stored processor-executable instructions are configured to cause a processor of a device to perform operations further comprising:
sending a communication including the key to a port of the at least one resource computing device.

48. The non-transitory processor readable medium of claim 47, wherein the stored processor-executable instructions are configured to cause a processor of a device to perform operations such that:
the service response message further includes a location indication and a geofence indication of the at least one resource computing device; and
sending the communication including the key to the port of the at least one resource computing device comprises:
determining whether a current location of the computing device is within an area defined by the location indication and the geofence indication; and
sending the communication including the key to the port of the at least one resource computing device in response to determining the current location of the computing device is within the area defined by the location indication and the geofence indication.

* * * * *